United States Patent [19]

Settle

[11] 4,221,061

[45] Sep. 9, 1980

[54] CLUED LETTER SET

[76] Inventor: Carl L. Settle, 2161 Plantation La., Atlanta, Ga. 30341

[21] Appl. No.: 913,342

[22] Filed: Jun. 7, 1978

[51] Int. Cl.³ ............................................. G09B 17/00
[52] U.S. Cl. ...................................... 35/35 R; 35/71; 35/72
[58] Field of Search .................. 35/35 R, 35 H, 35 J, 35/69, 70, 71, 72, 73; 40/594, 619; 273/153, 156, 157 R

[56] References Cited

U.S. PATENT DOCUMENTS

| 683,267 | 9/1901 | Froehlich | 35/35 J |
|---|---|---|---|
| 1,732,980 | 10/1929 | Mooney | 35/71 |
| 1,752,248 | 3/1930 | Fransen | 273/157 R |
| 2,586,039 | 2/1952 | Heggedal | 40/594 |
| 3,426,451 | 2/1969 | Hoffmann | 35/35 R |
| 3,715,812 | 2/1973 | Novak | 35/35 J |
| 4,030,211 | 6/1977 | McGinley | 35/35 H |
| 4,037,846 | 7/1977 | Zeeman | 273/157 R |

FOREIGN PATENT DOCUMENTS

856215  3/1940  France ..................................... 35/35 R

*Primary Examiner*—William H. Grieb
*Attorney, Agent, or Firm*—Robert B. Kennedy

[57] ABSTRACT

A set of alphabetical letters in material form for composing words with word pronunciation clued by structural distinctions between members of the set in addition to structural differences denoting alphabetic distinctions.

13 Claims, 19 Drawing Figures

DATE = DATE (DĀT)

= Date (DāT)

= Pete (PēT)

= Night (NīT)

= Bow (Bō)

= Use (Yüs)

= "A" in Apple (Ap´əl)

= "A" in Saw (Sô)

= "A" in Star (STAR)

= "E" IN HEY (HĀ)

= "E" IN STEP (STEP)

= "I" IN LITER (LĒTƏR)

= "I" IN SIT (SIT)

13B  = "OO" IN FOOD (FÜD)

= "OO" IN HOOK (HŌŎK)

= "O" IN ONCE (WUNS)

= "O" IN OW OR OUCH (AÜCH)

17B  = "O" IN BOX (BÄX)

CLUED LETTER SET

BACKGROUND OF THE INVENTION

This invention relates generally to teaching aids, and particularly to aids in teaching word pronunciation.

Learning to read, to write, to comprehend and to pronounce the words of a written language is one of the most difficult yet necessary of human tasks. The learning of pronunciation is particularly difficult in view of the fact that the sound of letters change and assume several variations when incorporated into the bodies of different words. In some cases such variations in pronunciation are orderly and follow rules but in other cases they vary illogically and have to be learned by rote memory.

Heretofore, dictionaries have been provided with pronunciation keys as a guide to pronunciation. These keys include various symbols such as accent marks, syllable separations, symbols for silent consonants and so forth. Keyed charts have also been devised as disclosed in U.S. Pat. No. 4,030,211 for teaching word pronunciation. Color codes have also been developed as exemplified by those disclosed in U.S. Pat. Nos. 683,267, 1,732,980 and 3,715,812.

A problem associated with each of these prior art approaches and techniques has been the fact that the student must learn the meaning of the symbols and various color codes themselves in addition to the principal task at hand of learning the word pronunciations in which such symbols and codes are employed. This has tended to lessen the effectiveness of such prior art approaches.

Accordingly, it is an object of the present invention to provide improved means of teaching word pronunciation.

More specifically, it is an object of the invention to provide a set of alphabetical letters which themselves provide a clue to pronunciation of the words which they form.

Another object of the invention is to provide a set of alphabetical letters whose structure, size or shape provide a clue to word pronunciation based on common human experience unassociated with language in written form itself.

SUMMARY OF THE INVENTION

In a preferred form of the invention a set of alphabetical letters is provided in material form for composing words with word pronunciation clued by structural distinction between letter members of the set in addition to structural differences denoting alphabetical distinctions. Exemplary of such structural distinctions are variations in letter size, in material transparancy, and in letter shape.

BRIEF DESCRIPTION OF THE DRAWING

FIGS. 13A and 13B respectively illustrate the obverse and reverse sides of an alphabetic letter in material form in accordance with the invention. The English pronunciation of the letter is also indicated.

FIGS. 17A and 17B respectively illustrate the obverse and reverse sides of an alphabetic letter in material form in accordance with the invention. The English pronunication of the letter is also indicated.

DESCRIPTION OF THE PREFERRED EMBODIMENTS

Figure 1:
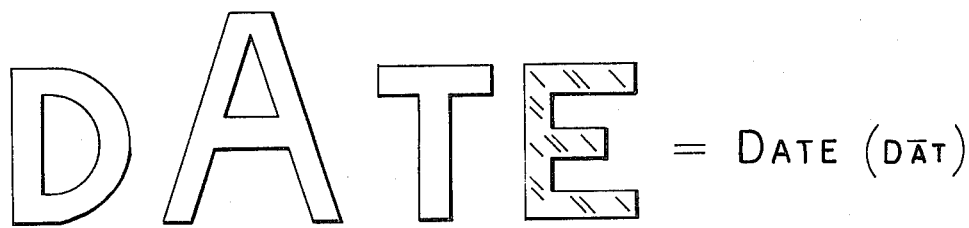
FIGS. 1-5 illustrate five words of the English language using alphabetic letters in material form which embody principles of the present invention. The English pronunciation of each word is also indicated in each Figure.
Figure 2:
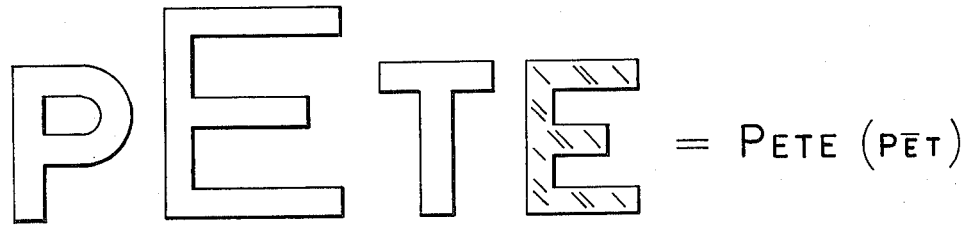

With reference next to the drawing several specific examples of alphabetic letters emboding principles of the invention are illustrated. In FIG. 1 the word DATE is seen to be composed of the letters DAT formed of an opaque material such as wood while the forth letter E is formed of a transparent material such as a clear plastic. The transparency of the letter E here serves to denote a silent pronunciation of this letter. In other words the student in seeing the letter E as relatively clear in his mind quickly associates the clued absence of the letter itself and thus its pronunciation in the word DATE. Here it will also be seen that the letter A is of a height greater than that of the other three letters in the word. In other words it is longer than the other letters which clues it as to be given a long vowel sound. Thus, here the structural distinctions possessed by the letters A and E readily inform the student that the word is pronounced as $\overline{DAT}$ with the letter A being given a long vowel sound and the letter E being silent. In the same manner the word PETE in FIG. 2 is readily identified as being pronounced $\overline{PET}$ in as much as the taller letter E is given a long E vowel sound while the shorter, transparent letter E is hardly pronounced.

Figure 3:
Figure 4:
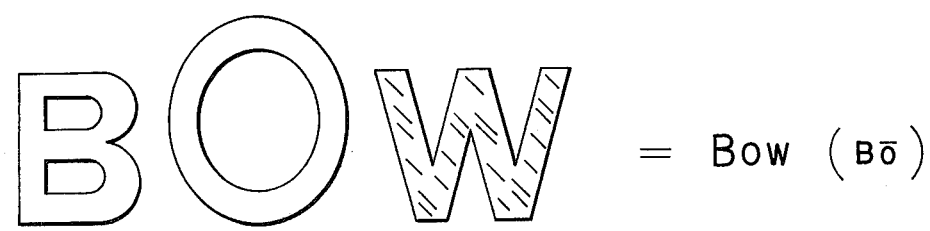
Figure 5:
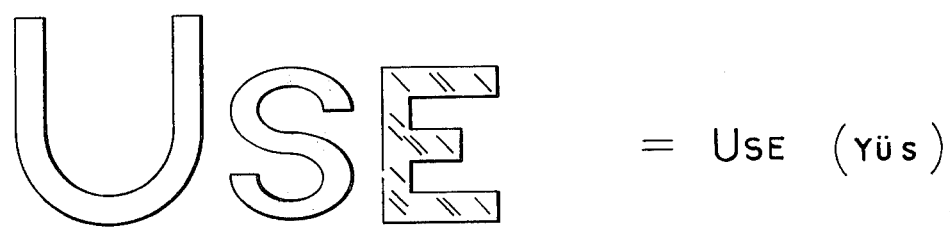

Other examples of long vowel and silent pronunciations are shown in FIGS. 3-5. In FIG. 3 the word NIGHT is readily shown to be pronounced $\overline{NIT}$ by employing the letter I having a height greater than that of the other four letters, and by using transparent material for the letters G and H. Similarly, in FIG. 4 the word BOW is seen to be prononounced $\overline{BOW}$ by employing the letter O of a height greater than that of the letters B and W, and by using a transparent letter W. Once more in FIG. 5 the word USE is seen to be pronounced $\overline{USE}$ by using the letter U of a height greater than that of the other letters, and by employing a transparent letter E.

Figure 6:
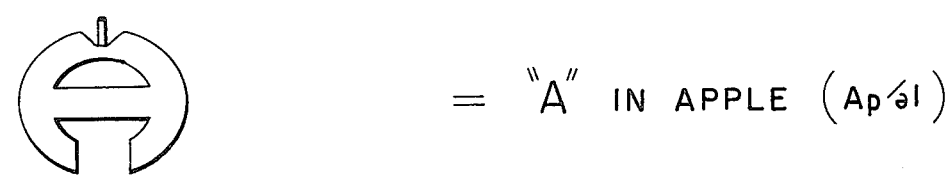
FIGS. 6-12, 15 and 16 each illustrate an alphabetic letter in material form that embodies principles of the invention. The English pronunciation of each letter is also indicated in each Figure.
Figure 7:
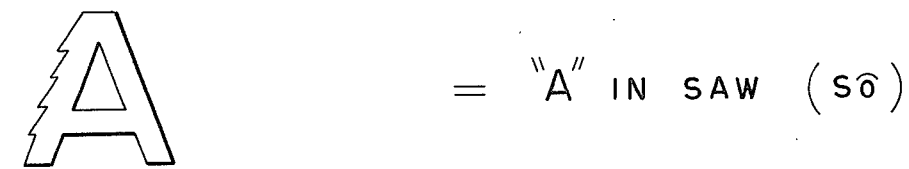
Figure 8:
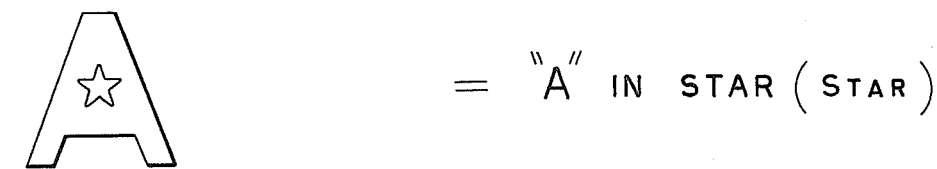

Shapes may also be used to suggest certain sounds as exemplified by the examples shown in the other figures. In FIG. 6 the letter A is formed in such a manner as to symbolize an apple as by curving the two upright legs into semi-circles and by employing a short stem projecting from the apex of the letter. In FIG. 7 one of the upright legs forming the letter A is seen to be formed with a serrated edge to suggest the pronunciation of the letter A as in SAW ($S\overline{O}$). In FIG. 8 the letter A is formed with a hole shaped as a star to denote a pronunciation of the letter A as in the word STAR (STAR).

Figure 9:
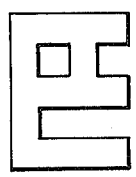
Figure 10:
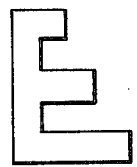
Figure 11:
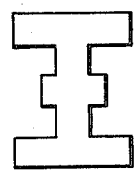
Figure 12:
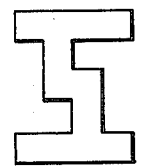
Figure 13A:
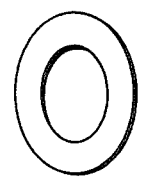
Figure 13A:
Figure 14:
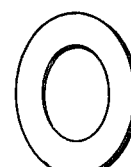
FIG. 14 illustrates a pair of alphabetic letters to be used in adjacent arrangement in a word in accordance with the invention. The English pronunication of the letter pair is also indicated.
Figure 14:
Figure 15:
Figure 16:
Figure 17A:
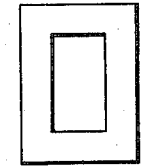
Figure 17A:
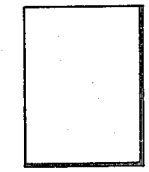

In addition to the vowel A the other vowels E, I and O may also assume shapes to suggest their pronunciation in particular words. For example, in FIG. 9 the letter E is formed with a vertical link between the two upper lateral branches to suggest a pronunciation of the letter E as in the word HEY ($H\overline{A}$). In FIG. 10 the horizontal branches of the letters E are of stepped lengths to suggest the pronuncation of the letter as in the word STEP (STEP). In FIG. 11 the vertical stem of the letter I is formed with a cross or laterally traverse projection to suggest the pronunciation I as in LITER (LĒT R). In FIG. 12 the center stem of the letter I is stepped to suggest a chair or stool for the pronunciation as in the word SIT (SIT). In FIGS. 13a and 13b the letter O is seen to be formed with a depression in the face of it but with a flat, disc-shaped rear surface to suggest the proper pronunciation for the double letter OO as in FOOD (FÜD) once a bit of real or artificial food has been placed in this cup-like receptacle. In FIG. 14 the face sides of the two letters OO are shown hooked together to suggest a pronunciation of the double vowel as in the word HOOK (HŌŌK). In FIG. 15 the letter O is formed with the numerical symbol 1 composed partly of a vertical structure bar bisecting the central aperture of the letter in conjunction with printed indicia extensions from the sides of the vertical bar. This suggests the pronunciation for the letter O as in ONCE (WUNS). In FIG. 16 the letter O is shown in the form of a disc having three oval depressions arranged triangularly to symbolize the two eyes and mouth of a person, and with eyebrows shown as printed indicia to suggest pronunciation of the letter O in OOW or OUCH (AÜCH). In FIGS. 17a and 17b the letter O is seen to be a rectangular formation having a front surface with a central rectangular depression and a planar rear surface. This shape is used to denote a pronunciation for the letter O as that used in the word BOX (BAX).

There are of course many other structural distinctions other than those distinctions which denote descriminations in alphabetic characters themselves which are possible utilizing principles of the invention. Therefore it should be understood that the just described embodiments merely illustrate principles of the invention in selected forms. Many modifications, additions and deletions may thus be made thereto without departure from the spirit and scope of the invention as set forth in the following claims.

I claim:

1. An aid for teaching word pronunciation comprising:
   a set of alphabetical letters in material form, said letters being arrangeable to form words;
   at least one of said letters having a structural distinction from other letters in said set, in addition to conventional differences of alphabetic configuration;
   said structural distinction selected from a group of at least three structural distinctions, each distinction denoting a particular pronunciation of said letter in the formed word;
   one of said distinctions being that the letter is transparent, to denote that the letter is silent in the formed word;
   another of said distinctions being that the letter is of a greater height than the other letters, to denote that the letter is to be pronounced with a long vowel sound;
   still another of said distinctions being that the letter is in the shape of an object, to denote that the letter is to be pronounced as in the word for the depicted object.

2. A teaching aid in accordance with claim 1 wherein said set of alphabetical letters includes the letter A shaped to represent an apple to denote its pronunciation as being that of the letter A in the word APPLE.

3. A teaching aid in accordance with claim 1 wherein said set of alphabetical letters includes the letter A shaped to represent a saw blade to denote its pronunciation as being that of the letter A in the word SAW.

4. A teaching aid in accordance with claim 1 wherein said set of alphabetical letters includes the letter A shaped to represent a star to denote its pronunciation as being that of the letter A in the word STAR.

5. A teaching aid in accordance with claim 1 wherein said set of alphabetical letters includes the letter E having a vertical stem from which three horizontal branches project, and with two adjacent horizontal branches connected at a point spaced laterally from said stem to denote its pronunciation as being that of the letter E in the word HEY.

6. A teaching aid in accordance with claim 1 wherein said set of alphabetical letters includes the letter E having a vertical stem from which three vertically spaced branches laterally extend, and wherein the branches are from top to bottom of mutually increasing lengths to denote its pronunciation as being that of the letter E in the word STEP.

7. A teaching aid in accordance with claim 1 wherein said set of alphabetical letters includes the letter I having a vertical stem from the upper, middle and lower portion of which three branches laterally extend from each side of said stem to denote its pronunciation as being that of the letter I in the word LITER.

8. A teaching aid in accordance with claim 1 wherein said set of alphabetical letters includes the letter I having a vertical stem of stepped construction to denote its pronunciation as being that of the letter I in the word SIT.

9. A teaching aid in accordance with claim 1 wherein said set of alphabetical letters includes the letter O having a front surface formed with a central depression and a flat, disc-shaped rear surface, to denote its pronunciation as being that of the double letter OO in the word FOOD.

10. A teaching aid in acccordance with claim 1 wherein said set of alphabetical letters includes a pair of letters O hooked together to denote its pronunciation as being that of the double letter OO in the word HOOK.

11. A teaching aid in accordance with claim 1 wherein said set of alphabetical letters includes the letter O of annular structure defining a central opening bridged by a vertical bar and bearing indicia representation of the numeral one in conjunction with the periphery of said vertical bar to denote its pronunciation as being that of the letter O in the word ONCE.

12. A teaching aid in accordance with claim 1 wherein said set of letters includes the letter O of disc-shaped structure having a flat face formed with three triangularly oriented depressions representative of two eyes and a mouth of a face to denote its pronunciation as being that of the letter O in the word OUCH.

13. A teaching aid in accordance with claim 1 wherein said set of letters includes the letter O of rectangularly shaped periphery and having a front surface formed with a central depression and a flat rear surface to denote its pronunciation as being that of the letter O in the word BOX.

* * * * *